United States Patent
Said et al.

(10) Patent No.: US 9,482,461 B2
(45) Date of Patent: Nov. 1, 2016

(54) COOLANT HEAT EXCHANGER HAVING A SCRAPER FOR EACH HEAT EXCHANGE INTERFACE SURFACE

(71) Applicant: KING FAHD UNIVERSITY OF PETROLEUM AND MINERALS, Dhahran (SA)

(72) Inventors: Syed A. M. Said, Dhahran (SA); Muhammad Umar Siddiqui, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 440 days.

(21) Appl. No.: 13/974,019

(22) Filed: Aug. 22, 2013

(65) Prior Publication Data

US 2015/0052931 A1    Feb. 26, 2015

(51) Int. Cl.
| | |
|---|---|
| F25D 21/06 | (2006.01) |
| F25C 1/00 | (2006.01) |
| F25C 1/14 | (2006.01) |
| F28F 17/00 | (2006.01) |
| F28F 19/00 | (2006.01) |
| F25D 17/02 | (2006.01) |
| F28D 1/06 | (2006.01) |
| F28D 9/04 | (2006.01) |
| F28D 20/02 | (2006.01) |
| F28D 20/00 | (2006.01) |

(52) U.S. Cl.
CPC ................. *F25D 17/02* (2013.01); *F28D 1/06* (2013.01); *F28D 9/04* (2013.01); *F28D 20/02* (2013.01); *F28F 19/006* (2013.01); *F28F 19/008* (2013.01); *F28D 2020/0069* (2013.01); *F28D 2020/0078* (2013.01); *F28D 2020/0086* (2013.01); *Y02E 60/145* (2013.01)

(58) Field of Classification Search
CPC ..... F25D 17/02; F28F 19/006; F28F 19/008; F28F 17/00
USPC ............................... 62/347, 284, 354; 165/94
See application file for complete search history.

(56) References Cited

U.S. PATENT DOCUMENTS

| | | | | |
|---|---|---|---|---|
| 2,259,841 A | * | 10/1941 | Spiegl | C09K 5/063 252/70 |
| 2,919,561 A | | 1/1960 | Lees | |
| 3,159,986 A | | 12/1964 | King | |

(Continued)

FOREIGN PATENT DOCUMENTS

| | | |
|---|---|---|
| JP | 3-204577 | 9/1991 |
| JP | 2000-304307 | 11/2000 |

*Primary Examiner* — Allen Flanigan
*Assistant Examiner* — Filip Zec
(74) *Attorney, Agent, or Firm* — Richard C. Litman (57) ABSTRACT

The heat exchanger is adapted for cooling a coolant (e.g., water), used to cool a device or an area (e.g., building interior), such as during periods of peak energy cost and usage, to save energy and energy costs. The heat exchanger includes a coolant storage tank with one or more refrigerant circulators in contact with the floor of the tank. The circulators use a refrigerant having a freezing temperature colder than the coolant, with coolant on the floor of the tank forming a layer of ice thereon. A rotary scraper extends up through the tank floor from each circulator, with the scrapers operating to remove the thin layer of ice from the floor as the ice forms. The resulting ice chips are relatively small and thin, thus having a relatively large surface area for their volume in order to maximize melting and rapid cooling of the coolant.

6 Claims, 7 Drawing Sheets

(56) References Cited

U.S. PATENT DOCUMENTS

| | | | |
|---|---|---|---|
| 3,403,532 A * | 10/1968 | Knowles | F25C 1/145 62/347 |
| 3,587,241 A * | 6/1971 | Hagen | F25D 25/04 165/120 |
| 3,675,436 A * | 7/1972 | Ganiaris | C02F 1/22 62/50.2 |
| 3,921,415 A | 11/1975 | Kattis | |
| 4,538,428 A | 9/1985 | Wilkerson | |
| 4,760,710 A * | 8/1988 | Takagi | F25C 1/145 165/133 |
| 4,796,441 A | 1/1989 | Goldstein | |
| 4,829,782 A | 5/1989 | Mueller et al. | |
| 5,168,724 A | 12/1992 | Gilbertson et al. | |
| 5,307,646 A | 5/1994 | Niblock | |
| 5,735,136 A * | 4/1998 | Howe | F25C 1/145 165/169 |
| 5,778,683 A | 7/1998 | Drees et al. | |
| 6,367,268 B1 * | 4/2002 | Paul | B60H 1/3235 62/330 |
| 8,215,124 B2 | 7/2012 | Hogan et al. | |
| 2009/0145154 A1 * | 6/2009 | Konrad | F25D 15/00 62/298 |

* cited by examiner

COOLANT HEAT EXCHANGER HAVING A SCRAPER FOR EACH HEAT EXCHANGE INTERFACE SURFACE

BACKGROUND OF THE INVENTION

1. Field of the Invention

The present invention relates generally to heating and cooling systems, and particularly to a heat exchanger in cooling systems to save energy in cooling operations, such as during peak utility use periods.

2. Description of the Related Art

The need to produce heated or cooled air or other fluid, and/or to transfer warmer or cooler air or other fluid from one location to another, has been evident for some time. Contemporary means for cooling the interior of a structure is by air conditioning, essentially comprising a fluid refrigerant that changes phase from liquid to gas depending upon its temperature and pressure. A compressor is used to drive the refrigerant through the system, with expansion of the fluid from liquid to gas resulting in a decrease in temperature that is transferred to the area being cooled. More generally, such systems are known as "heat pumps," and are reversible to deliver warmer air into the structure when desired.

All of these systems require energy input, as their compressors are generally relatively high power demand devices. They are generally powered by electrical power from the local electrical grid or network. Electrical power companies have long recognized that electrical demand is greatest at certain times of the day, depending upon the season and ambient temperature. In warmer conditions, electrical demand is of course highest during the warmest part of the day, with demand decreasing as the temperature cools. Accordingly, electrical power companies generally increase the cost of electricity to the consumer during the periods of greatest demand, both to encourage conservative use during those periods in order to encourage reducing the need for more power production, for example.

A number of devices have been developed in response to the above-described electrical rate adjustment system, with such devices universally operating during off-peak times and storing the resulting cold mass (e.g., water, etc.) to cool the desired area during periods of higher energy cost, typically during the warmer part of the day. These devices generally operate at a sufficiently low temperature as to produce ice buildup on the water contact surface of the interface between the cooling agent and the water being cooled. Ice production is desirable, as the colder temperature of the ice is capable of absorbing more heat from the volume being cooled. However, it can be difficult to remove ice from the freezing surface (e.g., cooling coils, etc.), which ice removal process requires energy over and above the energy required for cooling. Also, many such systems produce ice in relatively large volumetric units (e.g., ice cubes or blocks, etc.), with the relatively high volume to surface area ratio of such ice reducing the ability of the ice to melt rapidly to absorb heat from the water.

An example of a device to remove ice from a surface is found in Japanese Patent Publication No. 3-204577 published on Sep. 16, 1991 to Daikin Industries, Ltd. This reference describes a hollow cylindrical container adapted to form ice upon its inner surface. A concentric shaft rotates within the cylinder, with elongate scraper blades extending radially from the shaft to bear against the inner wall of the cylinder. The blades are stiffened by a metal insert to limit distortion.

An example of a cooling system that produces water ice for use in cooling the water in the system is found in Japanese Patent No. 2000-304307 published on Nov. 2, 2000 to Tohoku Electric Power Co. et al. This reference describes a cooling system having several tanks, with ice being formed in one tank and then transferred to another tank for melting and cooling water within that tank.

Thus, a heat exchanger addressing the aforementioned problems is desired.

SUMMARY OF THE INVENTION

Embodiments of a heat exchanger essentially include a coolant tank or container having a coolant inlet manifold at its top and a coolant outlet manifold at its bottom. The coolant is preferably water, but may be some other liquid as desired. The tank includes a series of perforated baffles therein to limit the movement of ice within the tank while still allowing water to flow through the perforations of the baffles, thus providing a greater amount of water flow and contact with the ice within the tank.

At least one, and desirably a series of, refrigerant circulators are installed adjacent the floor of the tank. Each of these refrigerant circulators desirably has a low, flat circular form with a coil or spiral coolant path therein. Inlet and outlet manifolds are provided to transfer refrigerant to and from the circulators. The refrigerant can be a brine solution to produce a freezing point lower than that of pure water, or the refrigerant can be some other solution having a relatively low freezing point, such as having a freezing point lower than the coolant, for example.

As the refrigerant circulators are in contact with the floor of the tank, ice forms from the coolant, such as water, on the floor of the tank during operation of the system. Accordingly, each of the circulators has a rotary scraper extending upwardly therefrom, the shaft of the rotary scraper extending through the floor of the water tank. The scrapers rotate, such as over the floor of the tank, to remove the ice formed from the cooled coolant on the floor from the bottom of the tank, with the removed ice having the form of a multitude of very thin ice flakes to maximize the surface area of each piece of ice and therefore maximize heat transfer from the water to melt the ice. The coolant, such as the chilled water (or other coolant), can be stored in the tank until needed, or the coolant can be circulated from the coolant inlet manifold through the tank to the coolant outlet manifold, and then removed from the tank through the coolant outlet manifold for use in cooling operations, such as in another area (e.g., the interior of a building structure, etc.) or device, for example.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

The heat exchanger uses a refrigerant that is cooled, such as can be suitably cooled during off-peak periods of electrical use when the cost of electrical power, or other energy, such as natural gas, can be less expensive, for example, and the refrigerant is used to cool a liquid coolant, such as water or other suitable coolant liquid. The water or other coolant can then be used to cool a location, an area (e.g., building interior, etc.), a structure or a device, for example, to save energy during a cooling operation.

Figure 1:
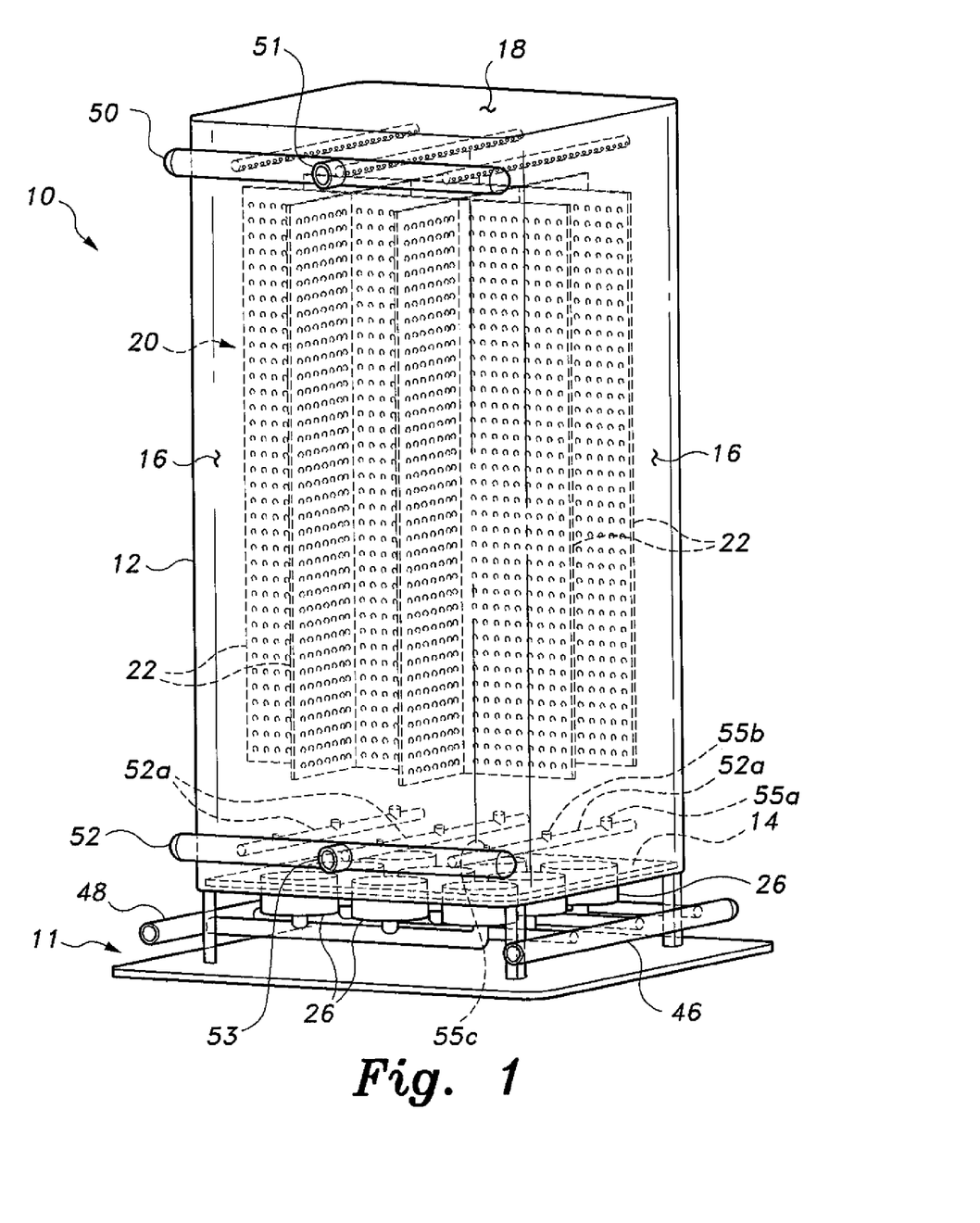
FIG. 1 is a perspective view of a heat exchanger according to the present invention, illustrating its basic structure.
Figure 2:
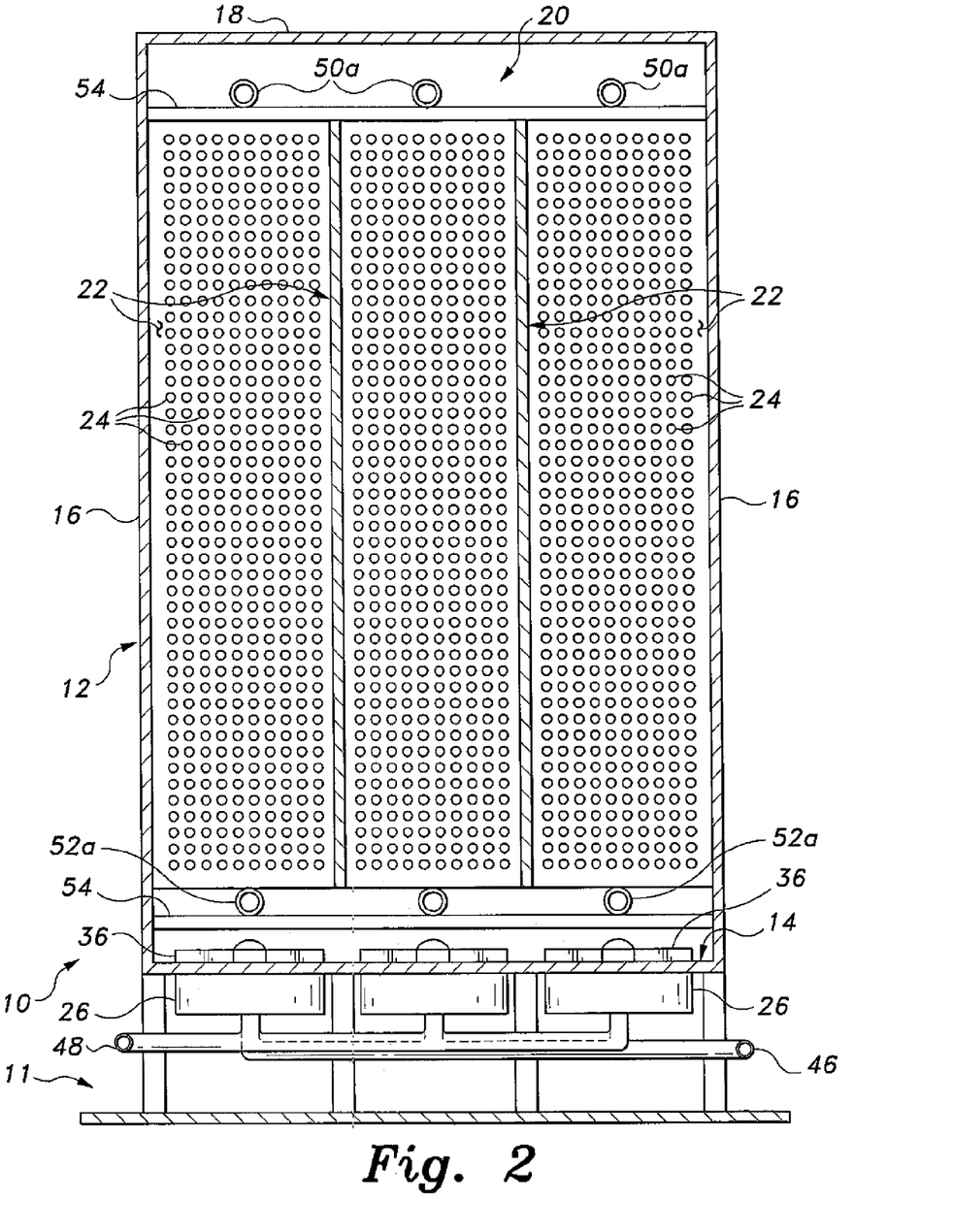
FIG. 2 is a side elevation view in section of the heat exchanger according to the present invention, illustrating further details thereof.

FIG. 1 of the drawings provides a perspective view of an embodiment of a heat exchanger 10, with FIG. 2 providing an elevation view of the heat exchanger 10 in section. The heat exchanger 10 includes a coolant tank 12 for water or other coolant, as desired. The coolant tank 12 is a substantially closed structure having a floor 14, side walls 16, and a top 18, with the floor 14, the walls 16, and the top 18 defining an interior volume 20 of the coolant tank 12. The interior volume 20 includes a plurality of vertically oriented, perforated baffles 22 therein, with the baffles 22 serving to reduce movement of ice within the coolant tank 12, while the perforations 24 (shown more clearly in FIG. 2) allow a relatively free flow of water (or other coolant) in the interior volume 20, for example. The heat exchanger 10 can be supported, such as in a generally upright position, on a suitable supporting arrangement, such as a platform and column type supporting structure 11 illustrated in FIGS. 1 and 2, for example.

Figure 4:
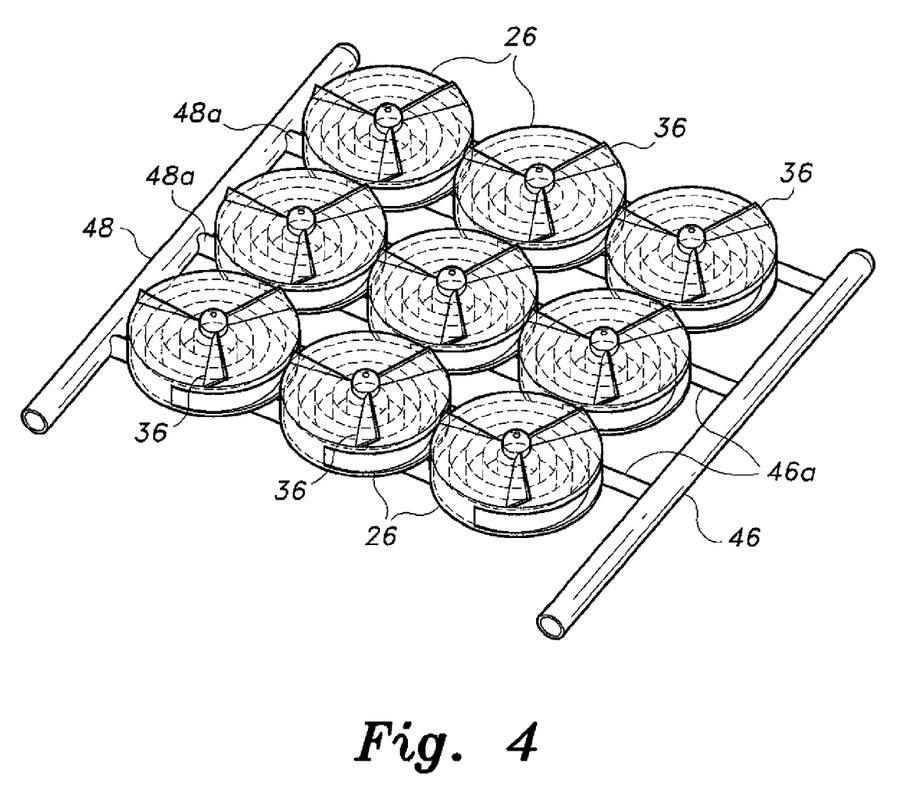
FIG. 4 is a top perspective view of an array of refrigerant circulators of the heat exchanger according to the present invention.
Figure 5:
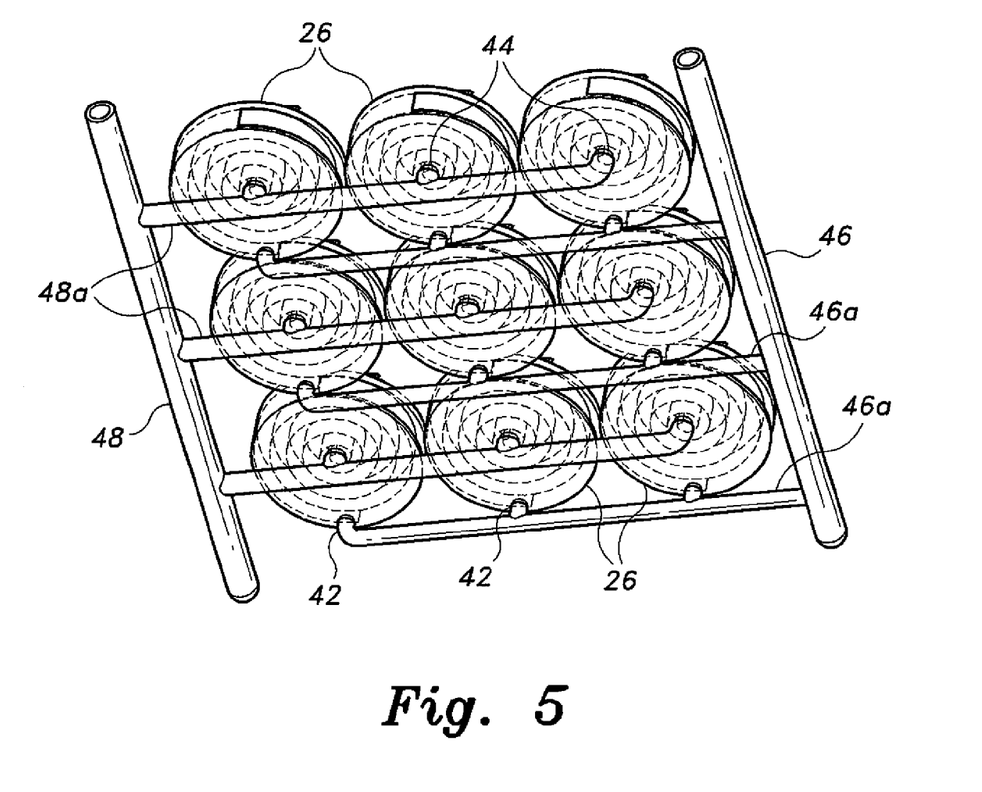
FIG. 5 is a bottom perspective view of the array of refrigerant circulators of FIG. 4, of the heat exchanger according to the present invention.

A plurality of refrigerant circulators 26 are installed adjacent the floor 14 of the coolant tank 12, and serve to circulate a suitable refrigerant in contact with or in communication with the tank floor 14 in order to cool the coolant within the coolant tank 12. While a single relatively large refrigerant circulator 26 can be provided, it is desirable to provide a relatively large number of refrigerant circulators 26, e.g., nine in a three by three matrix as shown in FIGS. 4 and 5 for the substantially square platform of the tank floor 14 in the illustrated embodiment of the heat exchanger 10, and the number of refrigerant circulators used can depend on the particular use or application, for example.

Figure 3:
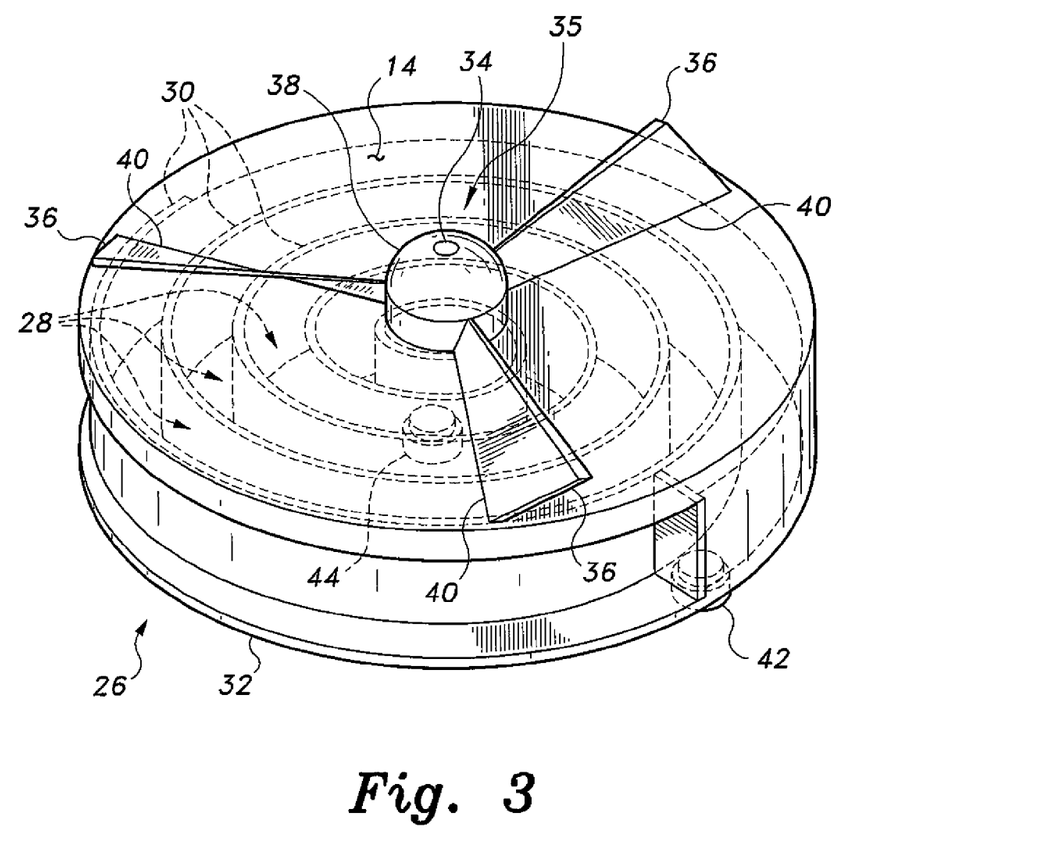
FIG. 3 is a detailed perspective view of a refrigerant circulator of the heat exchanger according to the present invention, illustrating details thereof.

FIG. 3 illustrates a single exemplary refrigerant circulator 26. The refrigerant circulator 26 has a suitable configuration for a use or application, such as a generally circular configuration, and includes a refrigerant pathway 28, such as a closed spiral refrigerant pathway, provided for the refrigerant to flow therethrough. The refrigerant pathway 28 is defined by a spiral wall 30 that is positioned between a bottom 32 of the refrigerant circulator 26 and the adjacent, overlying floor 14 of the coolant tank 12. A circular portion of the floor 14 is shown covering the spiral wall 30 and closed spiral pathway 28 of the refrigerant circulator 26 in FIG. 3, with it being understood that the floor portion 14 shown in FIG. 3 is a relatively small portion of the floor 14 of the coolant tank 12 in FIGS. 1 and 2. Thus, the refrigerant circulating within the refrigerant circulator 26 is in contact with the lower surface of the floor 14, to remove heat conducted through the floor 14 from the overlying coolant within the interior volume 20 of the coolant tank 12 to cool the coolant.

The refrigerant used in the refrigerant circulators 26 of embodiments of a heat exchanger, such as the heat exchanger 10, is typically desirably a liquid having a freezing point lower than that of the coolant in the coolant tank 12, such as pure water as the coolant. With water as the coolant, a brine solution is desirably used as the refrigerant, due to its low cost and relatively low freezing point, for example. Although the refrigerant is typically in a liquid state when cooled below the freezing point of the coolant, such as water as the coolant, the heat transfer from the coolant, such as water or other coolant, within the coolant tank 12 through the floor 14 to the refrigerant within the refrigerant circulator 26 results in a relatively thin sheet of ice forming on the upper surface of the floor 14 from the cooling of the coolant. If this formed ice is allowed to build up, it typically thickens and can then act as an insulator between the subfreezing floor 14 and refrigerant therebelow and the remaining liquid coolant, such as water, within the coolant tank 12. It is desirable that this ice be removed and allowed to float upward in the coolant tank 12, to more effectively cool the water within the coolant tank 12, such as to enhance saving energy in a cooling operation of the heat exchanger 10.

Accordingly, an ice scraper mechanism or an ice scraper device 35, such as including a rotary scraper shaft 34 communicating with a hub 38 to which one or more ice scraper blades 36 are attached, can desirably be provided for each of the refrigerant circulators 26. The ice scraper mechanism or ice scraper device 35 can be integrated with, in communication with, or separate from the one or more refrigerant circulators 26, such as depending upon the use or application, for example. Also, a single ice scraper mechanism or ice scraper device 35, or a plurality of ice scraper mechanisms or ice scraper devices 35, can be provided for ice removal for ice formed over the floor 14 of the coolant tank 12 from the cooling of the coolant, such as depending on the use or application, for example. The ice scraper mechanism or ice scraper device 35 is desirably arranged and positioned adjacent to the corresponding refrigerant circulator 26, and the one or more ice scraper blades 36 are positioned over the floor 14 of the coolant tank 12 and can be desirably positioned in opposing relation to a corresponding refrigerant circulator 26, for example. The rotary scraper shaft 34 (the upper end of which may be seen in FIG. 3) is generally concentric with the refrigerant circulator 26, and extends upwardly therefrom to pass through the floor 14, such as normal or substantially normal to the plane of the floor 14, for example.

At least one ice scraper blade 36 extends radially from the hub 38 at the upper end of the rotary scraper shaft 34, there desirably being two or more such ice scraper blades 36; and three ice scraper blades 36 are illustrated in the ice scraper mechanism or the ice scraper device 35 in FIG. 3, for example. A motor, or other suitable motive device, can be provided beneath or associated with the refrigerant circulator 26, such as in the hub 38, or communicating with the rotary scraper shaft 34, or located at some other suitable location, to rotate the ice scraper blades 36. The motor, or other suitable motive device, can be conventional, e.g., electric, or perhaps hydraulic, depending upon the flow of refrigerant through the refrigerant circulator 26, to rotate the shaft 34, the hub 38, and the attached one or more ice scraper blades 36, for example.

Each ice scraper blade 36 has a leading edge 40 that is positioned over the floor 14, such as in contact or substantial contact with the upper surface of the floor 14, i.e., the surface of the floor 14 in communication with the interior volume 20 of the coolant tank 12. As the ice scraper blades 36 move, such as rotate, their leading edges 40 bear against or move over the underlying surface of the floor 14 to scrape and remove ice formed from the cooling of the coolant in the coolant tank 12 that can form on the upper surface of the floor 14 within the coolant tank 12. Desirably, only a relatively thin sheet of ice is allowed to form before the ice scraper blades 36 remove the ice. The removed ice is thus in the form of a relatively small and very thin sheet or crust having a relatively large surface area for its volume. This results in the chips of ice melting relatively rapidly, i.e., absorbing the heat from the surrounding water as they float upward within the coolant tank 12. This can result in relatively high efficiency in cooling the coolant, such as water, within the coolant tank 12.

Each refrigerant circulator 26 includes a first or inlet opening 42 adjacent the periphery of the refrigerant circulator 26 and a second or outlet opening 44 generally positioned adjacent the center of the refrigerant circulator 26. In this configuration, the brine (or other refrigerant) flows into the peripheral inlet opening 42 and flows by spiraling inwardly, for example, along the refrigerant flow path 28 and out of the refrigerant circulator 26 via the central outlet 44. However, it will be seen that the flow direction may be readily reversed, if so desired, depending upon the particular use or application, for example.

It is further desirable that a plurality of refrigerant circulators 26 be provided, e.g., nine in a three by three matrix, as shown in FIGS. 1, 2, 4 and 5, although the amount, arrangement and type of refrigerant circulators 26 can vary depending upon the use or application, for example, and should not be construed in a limiting sense. As illustrated in FIGS. 4 and 5, for example, a first refrigerant inlet manifold 46 having a series of branches 46a connects to the peripheral inlet openings 42 of the refrigerant circulators 26, as shown in the bottom perspective view of FIG. 5, with a second refrigerant outlet manifold 48 having a series of branches 48a connecting to the central outlets or outlet openings 44. The first refrigerant manifold 46 receives chilled refrigerant (brine, etc.), such as from a conventional source of refrigeration. Refrigerant that has absorbed heat from the coolant, such as water (or other liquid coolant), in the coolant tank 12 is returned via the second refrigerant outlet manifold 48 to be cooled again, such as until the cooling cycle is terminated.

Coolant flow (water, etc.) is provided through the coolant tank 12 in a similar manner, as shown in FIGS. 1 and 2. A first coolant manifold 50 having a coolant inlet 51 and having inlet manifold branches 50a is installed in the upper portion of the coolant tank 12, and a second coolant manifold 52 having outlet manifold branches 52a and having a coolant outlet 53 is installed, such as in opposing relation to the first coolant manifold 50, in the lower portion of the coolant tank 12 generally just above the ice scraper blades 36. The ends of the inlet manifold branches 50a and the outlet manifold branches 52a are supported by internal crossmembers 54 within the coolant tank 12, as shown in FIG. 2, for example.

Figure 6:
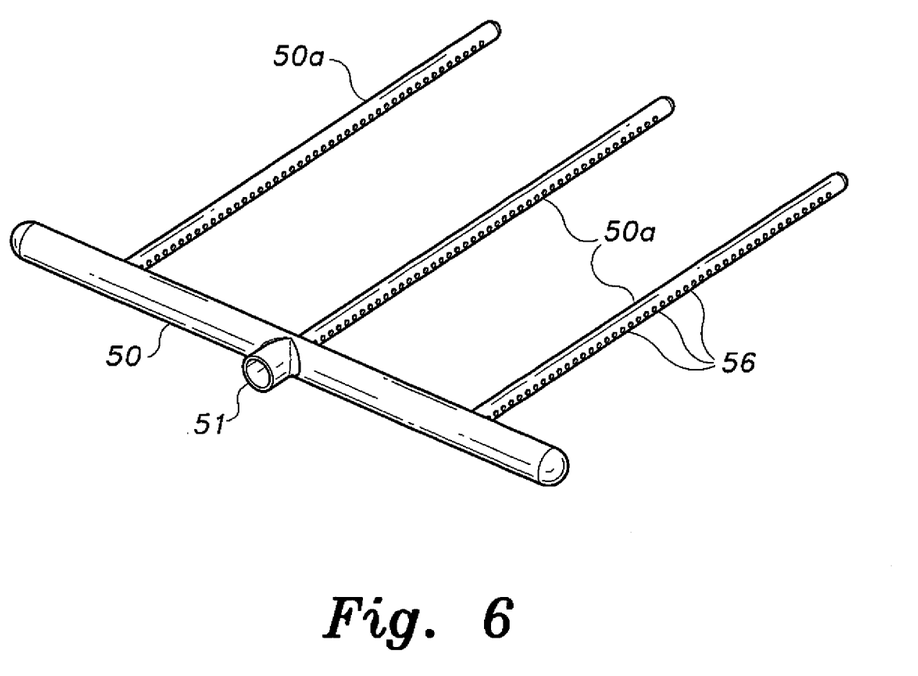
FIG. 6 is a top perspective view of the coolant inlet manifold of the heat exchanger according to the present invention, illustrating details thereof.

Desirably, the upper or first coolant manifold 50 is typically used as an inlet for the coolant, the coolant entering the first coolant manifold through the coolant inlet 51, with FIG. 6 providing a detailed view of the first coolant manifold 50. It is also desired that the coolant tank 12 not be completely filled with the coolant, but that there be some space at the top of the coolant tank 12 near the upper ends of the baffles 22. Accordingly, the inlet manifold branches 50a of the upper first coolant manifold 50 are provided with a large number of small spray passages or orifices 56 to spray the coolant, such as water (or other coolant), into the interior volume 20 of the coolant tank 12. Depending upon the humidity within the coolant tank 12, this can have some additional cooling effect due to evaporation in the upper portion of the coolant tank 12, for example.

Figure 7:
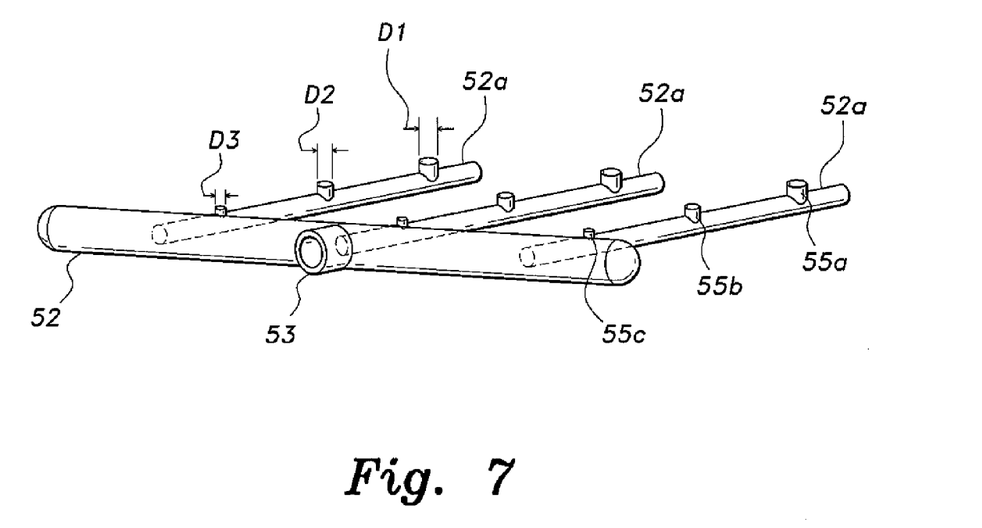
FIG. 7 is a top perspective view of the coolant outlet manifold of the heat exchanger according to the present invention, illustrating details thereof.

The lower second coolant manifold 52 is typically used as an outlet manifold for the coolant, the coolant exiting from the second coolant manifold 52 through the coolant outlet 53. The outlet manifold branches 52a of the second coolant manifold 52 include a number of upper passages, such as the upper passages 55a, 55b and 55c, disposed along each of the branches 52a, as illustrated in FIG. 1 and FIG. 7. The specific configuration of these upper passages, such as the upper passages 55a, 55b and 55c, can be of various configurations, such as dependent upon the particular use or application, so long as the upper passages, such as the upper passages 55a, 55b, and 55c, can receive the coolant and can permit or facilitate the flow of the cooled coolant, such as water (or other coolant), from the coolant tank 12, such as to a location, an area (e.g., building interior, etc.), a structure or a device, requiring cooling, for example.

Where separate passages or ports are provided, such as the upper passages 55a, 55b and 55c, the more distal ports are desirably somewhat larger in diameter than the ports or passages relatively closer to the second coolant manifold 52, in order to assist in relatively more evenly distributing flow of the coolant from the coolant tank 12, for example. In this regard, as illustrated in FIG. 7, the upper passage 55a has a diameter D1 that is larger than a diameter D2 of the upper passage 55b, and the upper passage 55b has the diameter D2 that is larger than a diameter D3 of the upper passage 55c, for example.

Accordingly, embodiments of a heat exchanger, such as the heat exchanger 10, can provide a relatively efficient means of cooling a location, an area (e.g., building interior, etc.), a structure or a device, as well as can enhancing energy saving in the cooling process or operation. Also, embodiments of a heat exchanger can also operate to remove heat from an area or volume at some selected time according to the desires of the user, such as to take advantage of lower rates for electrical power. Further, embodiments of a heat exchanger in cooling a coolant can potentially decrease the operation of relatively high energy demand devices, such as compressors and the like, during periods of higher energy costs, for example. The embodiments of the heat exchanger thus can provide a potential savings for the operator or user thereof.

It is to be understood that the present invention is not limited to the embodiments described above, but encompasses any and all embodiments within the scope of the following claims.

We claim:
1. A heat exchanger, comprising:
   a coolant tank to receive a coolant, the coolant tank having a floor and an interior volume;
   a plurality of refrigerant circulators disposed in communication with the floor of the coolant tank to circulate a refrigerant to cool the coolant in the coolant tank; and at least one ice scraper device, the at least one ice scraper device including a rotary scraper shaft extending through the floor of the coolant tank from each of the plurality of refrigerant circulators, and the at least one ice scraper device including at least one ice scraper blade extending from a corresponding said rotary scraper shaft and positioned over the floor, the at least one ice scraper blade to selectively rotate with a corresponding said rotary scraper shaft to move over the floor to scrape and remove the ice formed over the floor of the coolant tank from cooling of the coolant by the plurality of refrigerant circulators.

2. The heat exchanger according to claim 1, further comprising:
   each of the plurality of refrigerant circulators having a periphery and a center and a refrigerant path therein, the refrigerant path having a first inlet opening adjacent the periphery to receive a refrigerant to cool the coolant and a second outlet opening adjacent the center thereof to flow the refrigerant out from the refrigerant path;
   a first refrigerant manifold communicating with the first inlet opening of each of the plurality of refrigerant circulators; and
   a second refrigerant manifold communicating with the second outlet opening of each of the plurality of refrigerant circulators.

3. The heat exchanger according to claim 1, further comprising:
   a coolant inlet manifold communicating with the interior volume of the coolant tank to flow the coolant into the coolant tank; and
   a coolant outlet manifold communicating with the interior volume of the coolant tank to flow the coolant from the coolant tank.

4. The heat exchanger according to claim 3, wherein
   the coolant inlet manifold further includes a plurality of inlet manifold branches, the plurality of inlet manifold branches including a plurality of spray passages therein to spray the coolant into the interior volume of the coolant tank, and
   the coolant outlet manifold includes a plurality of outlet manifold branches, the plurality of outlet manifold branches including a plurality of passages to receive the coolant to distribute the flow of the coolant from the coolant tank.

5. The heat exchanger according to claim 1, further comprising:
   a plurality of perforated baffles disposed vertically within the interior volume of the coolant tank.

6. The heat exchanger according to claim 1, wherein the refrigerant comprises a brine refrigerant to selectively circulate through the plurality of refrigerant circulators.

* * * * *